(12) United States Patent
Proud et al.

(10) Patent No.: US 11,663,042 B2
(45) Date of Patent: *May 30, 2023

(54) SYSTEM FOR GENERATING ELECTRONIC ALERTS THROUGH PREDICTIVE OPTIMIZATION ANALYSIS OF RESOURCE CONVERSIONS

(71) Applicant: BANK OF AMERICA CORPORATION, Charlotte, NC (US)

(72) Inventors: Lee Ann Proud, Ponte Vedra, FL (US); Martha Sain McClellan, Lancaster, SC (US); Joseph Benjamin Castinado, North Glenn, CO (US); Kathleen Hanko Trombley, Oakboro, NC (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/566,394

(22) Filed: Dec. 30, 2021

(65) Prior Publication Data

US 2022/0121494 A1 Apr. 21, 2022

Related U.S. Application Data

(63) Continuation of application No. 16/534,865, filed on Aug. 7, 2019, now Pat. No. 11,263,050.

(51) Int. Cl.
*G06F 9/50* (2006.01)
*G06F 9/46* (2006.01)
*G06F 11/30* (2006.01)
*G06Q 20/10* (2012.01)
*G06Q 20/20* (2012.01)

(52) U.S. Cl.
CPC ............ *G06F 9/5011* (2013.01); *G06F 9/466* (2013.01); *G06F 9/5044* (2013.01); *G06F 11/3086* (2013.01); *G06Q 20/10* (2013.01); *G06F 11/3006* (2013.01); *G06F 2209/508* (2013.01); *G06Q 20/204* (2013.01)

(58) Field of Classification Search
None
See application file for complete search history.

(56) References Cited

U.S. PATENT DOCUMENTS

| | | | |
|---|---|---|---|
| 7,145,895 B2 | 12/2006 | Mueckenheim et al. | |
| 7,688,732 B2 | 3/2010 | Manzalini et al. | |
| 7,779,097 B2 | 8/2010 | Lamkin et al. | |
| 7,844,568 B2 | 11/2010 | Fein et al. | |
| 7,900,201 B1 | 3/2011 | Qureshi et al. | |
| 8,239,298 B1 * | 8/2012 | Wilson | G06Q 40/00 705/35 |

(Continued)

*Primary Examiner* — Abu Zar Ghaffari
(74) *Attorney, Agent, or Firm* — Moore & Van Allen PLLC; Seongun M. Hong

(57) ABSTRACT

A system generates electronic alerts through predictive analysis of resource conversions. The system may continuously monitor executed resource transfers to generate historical resource transfer data. Based on the historical resource transfer data, the system may generate a predicted outcome of executing transfers of resources in a first format compared to transfers of resources in a second format. The predicted outcome may then be implemented by the system to select a resource format for transfers occurring in the future and/or at specified intervals.

14 Claims, 2 Drawing Sheets

(56) References Cited

U.S. PATENT DOCUMENTS

| | | | |
|---|---|---|---|
| 8,650,420 B2 | 2/2014 | Kato et al. | |
| 8,733,636 B2 * | 5/2014 | Henry | G06Q 20/108 |
| | | | 235/379 |
| 8,812,943 B2 | 8/2014 | Stergiou et al. | |
| 8,935,198 B1 | 1/2015 | Phillips et al. | |
| 9,271,237 B2 | 2/2016 | Nirantar et al. | |
| 9,460,171 B2 | 10/2016 | Marrelli et al. | |
| 9,489,630 B2 | 11/2016 | Achin et al. | |
| 9,491,498 B2 | 11/2016 | Brooks et al. | |
| 9,613,190 B2 | 4/2017 | Ford et al. | |
| 9,705,817 B2 | 7/2017 | Lui et al. | |
| 10,033,702 B2 | 7/2018 | Ford et al. | |
| 2002/0126700 A1 | 9/2002 | Rokugo | |
| 2002/0178077 A1 | 11/2002 | Katz et al. | |
| 2007/0067373 A1 | 3/2007 | Higgins et al. | |
| 2009/0288012 A1 * | 11/2009 | Hertel | G06Q 20/105 |
| | | | 715/769 |
| 2011/0270763 A1 | 11/2011 | Graham et al. | |
| 2011/0302301 A1 | 12/2011 | Lowes et al. | |
| 2014/0245015 A1 | 8/2014 | Velamoor et al. | |
| 2014/0289386 A1 | 9/2014 | Vatto et al. | |
| 2016/0012465 A1 * | 1/2016 | Sharp | G06Q 20/321 |
| | | | 705/14.17 |
| 2016/0050129 A1 | 2/2016 | Hoyne | |
| 2016/0343093 A1 | 11/2016 | Riland et al. | |
| 2016/0371668 A1 * | 12/2016 | Priebatsch | G06Q 20/348 |
| 2017/0102693 A1 | 4/2017 | Kidd et al. | |
| 2017/0213219 A1 * | 7/2017 | Garden | G06Q 20/4016 |
| 2018/0046926 A1 | 2/2018 | Achin et al. | |
| 2018/0158146 A1 * | 6/2018 | Turner | G06Q 40/06 |
| 2018/0233028 A1 | 8/2018 | Rhoads et al. | |
| 2019/0349254 A1 | 11/2019 | Nolan et al. | |

\* cited by examiner

```
┌─────────────────────────────────────────────────────────────────┐
│   CONTINUOUSLY MONITOR A FIRST SET OF RESOURCE TRANSFERS EXECUTED│
│                         IN A FIRST FORMAT                        │
│                              201                                 │
└─────────────────────────────────────────────────────────────────┘
                                │
                                ▼
┌─────────────────────────────────────────────────────────────────┐
│   BASED ON CONTINUOUSLY MONITORING THE FIRST SET OF RESOURCE    │
│   TRANSFERS, GENERATE A SET OF HISTORICAL RESOURCE TRANSFER DATA │
│                              202                                 │
└─────────────────────────────────────────────────────────────────┘
                                │
                                ▼
┌─────────────────────────────────────────────────────────────────┐
│  GENERATE, BASED ON THE SET OF HISTORICAL RESOURCE TRANSFER DATA,│
│  A RESOURCE OPTIMIZATION REPORT, WHEREIN THE RESOURCE OPTIMIZATION│
│       REPORT COMPRISES A RESOURCE EFFICIENCY METRIC              │
│                              203                                 │
└─────────────────────────────────────────────────────────────────┘
                                │
                                ▼
┌─────────────────────────────────────────────────────────────────┐
│  DISPLAY THE RESOURCE OPTIMIZATION REPORT ON A GRAPHICAL INTERFACE│
│            OF A THIRD PARTY COMPUTING SYSTEM                     │
│                              204                                 │
└─────────────────────────────────────────────────────────────────┘
```

FIG. 2

SYSTEM FOR GENERATING ELECTRONIC ALERTS THROUGH PREDICTIVE OPTIMIZATION ANALYSIS OF RESOURCE CONVERSIONS

CROSS-REFERENCE TO RELATED APPLICATION

The present application is a continuation of co-pending U.S. patent application Ser. No. 16/534,865, of the same title and filed on Aug. 7, 2019, which is assigned to the assignee hereof and the contents thereof are hereby expressly incorporated by reference herein.

FIELD OF THE INVENTION

The present disclosure embraces a system for generating electronic alerts through predictive optimization analysis of resource conversions.

BACKGROUND

There is a need for an efficient way to perform resource transfers between users and authorized third parties.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a system for generating electronic alerts through predictive analysis of resource conversions. The system may continuously monitor executed resource transfers to generate historical resource transfer data. Based on the historical resource transfer data, the system may generate a predicted outcome of executing transfers of resources in a first format compared to transfers of resources in a second format. The predicted outcome may then be implemented by the system to select a resource format for transfers occurring in the future and/or at specified intervals.

Accordingly, embodiments of the present disclosure provide a system for generating electronic alerts through predictive analysis of resource conversions. The system may comprise a memory device with computer-readable program code stored thereon; a communication device; and a processing device operatively coupled to the memory device and the communication device. The processing device may be configured to execute the computer-readable program code to continuously monitor a first set of resource transfers in a first format; based on continuously monitoring the first set of resource transfers, generate a set of historical resource transfer data; generate, based on the set of historical resource transfer data, a resource optimization report, wherein the resource optimization report comprises a resource efficiency metric; and display the resource optimization report on a graphical interface of a third party computing system.

In some embodiments, the resource efficiency metric is a comparison of the first set of resource transfers in the first format with a second set of resource transfers in a second format.

In some embodiments, the resource efficiency metric comprises a visual indicator of resources saved between the first set of resource transfers in the first format and the second set of resource transfers in the second format.

In some embodiments, the graphical interface further comprises a numerical value associated with the visual indicator, wherein the numerical value indicates a magnitude of resource efficiency.

In some embodiments, the resource efficiency metric indicates whether executing resource transfers in the second format is more efficient than executing resource transfers in the first format.

In some embodiments, the resource efficiency metric is a projected resource efficiency metric based on historical transaction data.

In some embodiments, the set of historical resource transfer data comprises one or more transactions executed within a selected time frame.

Embodiments of the present disclosure also provide a computer program product for generating electronic alerts through predictive analysis of resource conversions. The computer program product may comprise at least one non-transitory computer readable medium having computer-readable program code portions embodied therein. The computer-readable program code portions may comprise executable code portions for continuously monitoring a first set of resource transfers in a first format; based on continuously monitoring the first set of resource transfers, generating a set of historical resource transfer data; generating, based on the set of historical resource transfer data, a resource optimization report, wherein the resource optimization report comprises a resource efficiency metric; and displaying the resource optimization report on a graphical interface of a third party computing system.

In some embodiments, the resource efficiency metric is a comparison of the first set of resource transfers in the first format with a second set of resource transfers in a second format.

In some embodiments, the resource efficiency metric comprises a visual indicator of resources saved between the first set of resource transfers in the first format and the second set of resource transfers in the second format.

In some embodiments, the graphical interface further comprises a numerical value associated with the visual indicator, wherein the numerical value indicates a magnitude of resource efficiency.

In some embodiments, the resource efficiency metric indicates whether executing resource transfers in the second format is more efficient than executing resource transfers in the first format.

In some embodiments, the resource efficiency metric is a projected resource efficiency metric based on historical transaction data.

Embodiments of the present disclosure also provide a computer-implemented method for generating electronic alerts through predictive analysis of resource conversions. The method may comprise continuously monitoring a first set of resource transfers in a first format; based on continuously monitoring the first set of resource transfers, generating a set of historical resource transfer data; generating, based on the set of historical resource transfer data, a resource optimization report, wherein the resource optimization report comprises a resource efficiency metric; and displaying the resource optimization report on a graphical interface of a third party computing system.

In some embodiments, the resource efficiency metric is a comparison of the first set of resource transfers in the first format with a second set of resource transfers in a second format.

In some embodiments, the resource efficiency metric comprises a visual indicator of resources saved between the first set of resource transfers in the first format and the second set of resource transfers in the second format.

In some embodiments, the graphical interface further comprises a numerical value associated with the visual indicator, wherein the numerical value indicates a magnitude of resource efficiency.

In some embodiments, the resource efficiency metric indicates whether executing resource transfers in the second format is more efficient than executing resource transfers in the first format.

In some embodiments, the resource efficiency metric is a projected resource efficiency metric based on historical transaction data.

In some embodiments, the set of historical resource transfer data comprises one or more transactions executed within a selected time frame.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
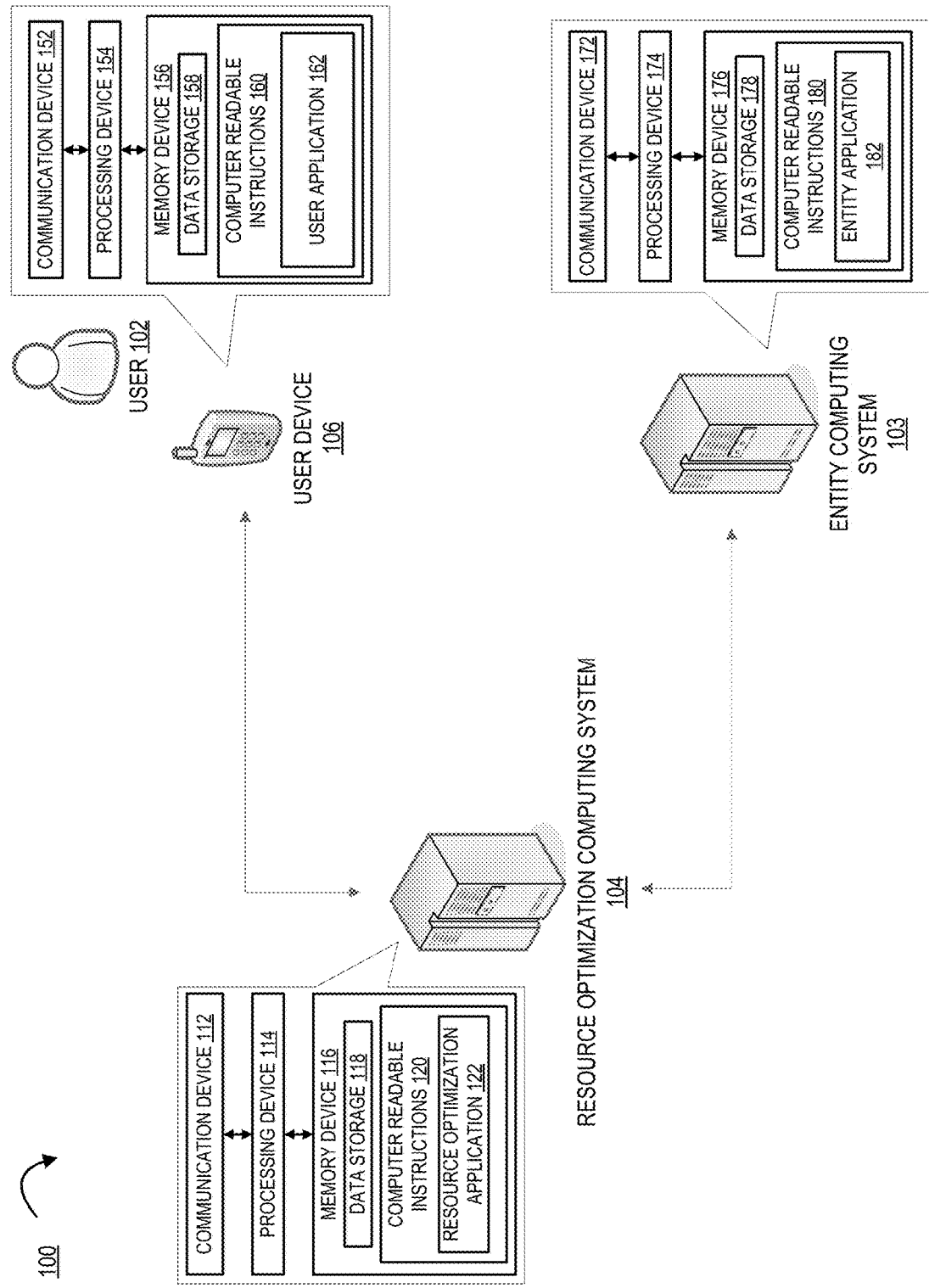

Having thus described embodiments of the invention in general terms, reference will now be made to the accompanying drawings, wherein:

FIG. 1 illustrates an operating environment for the resource optimization system, in accordance with one embodiment of the present disclosure; and FIG. 2 illustrates a process flow for the resource optimization system, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

"Resource" as used herein may refer to an object under the ownership of a user which is stored or maintained by the entity on the user's behalf. The resource may be intangible or tangible objects such as data files, documents, biographical data, funds, and the like. Typically, the user's account contains records of the resources owned by the user. Account data may be stored in an account database within the entity's systems.

Embodiments of the present disclosure provide a system for generating electronic alerts through predictive analysis of resource conversions. In particular, a system (e.g., a "resource optimization system") may execute resource transfers on behalf of one or more users. In this regard, the system may continuously collect historical data regarding the resource transfers executed by the system, where the resources may be in one or more of various formats. Based on the historical data, the system may determine whether or not such resource transfers would have been more efficiently transferred in one format as opposed to another. In this regard, the system may display a graphical interface which may comprise an indicator of the resource efficiency difference between resource transfers conducted via a first format against resource transfers conducted via a second format. The system may further generate projections for resource transfers taking place in the future, where the projections may include information about resource efficiency increases that may be realized for future resource transfers if such transfers are conducted in a specified format.

An exemplary embodiment is provided below for illustrative purposes. A third party entity (e.g., a company providing products or services) may conduct resource transfers (e.g., a currency transaction) with a user (e.g., a customer of the third party entity) in a first format (e.g., a default currency set by the entity). In some embodiments, the user may be a foreign customer of the third party entity who typically conducts resource transfers in a second format (e.g., a foreign currency). In such embodiments, the system may examine historical data (e.g., past transactions processed by the third party entity, currency values over time, exchange rates, or the like) to determine whether it would have been more resource efficient (e.g., the third party entity may have saved resources) to process transactions in certain formats (e.g., the foreign currency) than others (e.g., the default currency). In this regard, the system may display various types of resource efficiency data to the third party entity, such as savings per transaction (e.g., per foreign transaction), aggregate savings over a defined period of time (e.g., one month, one year), seasonal savings, or the like. In some embodiments, the system may further generate projected resource efficiency data based on the historical data, where the projected resource efficiency data may include savings that may be realized by the third party entity for future transactions. Based on the resource efficiency data as described above, the third party entity may implement one or more processes to support the execution of transactions in a second format (e.g., the foreign currency).

In some embodiments, the system may further provide for an automated enrollment process through which third party entities may become registered with platforms to conduct resources transfers in one or more optimal formats. For instance, if a third party entity would benefit from supporting the processing of transactions in a foreign currency, the system may automatically enroll the third party entity in the necessary products and/or services necessary to provide for such functionality.

Turning now to the figures, FIG. 1 illustrates an operating environment 100 for the resource optimization system, in accordance with one embodiment of the present disclosure. In particular, FIG. 1 illustrates a resource optimization computing system 104 that is operatively coupled, via a network, to a user device 106 and/or an entity computing system 103. In such a configuration, the resource optimization computing system 104 may transmit information to and receive information from the user device 106 and/or the entity computing system 103. It should be understood that FIG. 1 illustrates only an exemplary embodiment of the operating environment 100, and it will be appreciated that one or more functions of the systems, devices, or servers as depicted in FIG. 1 may be combined into a single system, device, or server. For instance, the functions of the resource optimization computing system 104 and the entity computing system 103 may be executed on a single computing system. Furthermore, a single system, device, or server as depicted in FIG. 1 may represent multiple systems, devices, or servers. For instance, though the user device 106 is depicted as a single unit, the user device 106 may represent multiple user devices which may be operated by multiple different users.

The network may be a system specific distributive network receiving and-distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

The user device 106 as depicted in FIG. 1 may be a device which is owned and/or operated by a user 102. The user 102 may use the user device 106 to log onto the resource optimization computing system 104 and/or the entity computing system 103 to access the resource monitoring functions as described herein. For instance, the user 102 may use the user device 106 to conduct an electronic transaction with the entity computing system 103, which may be owned and/or operated by a third party that provides products or services to the user 102. In this regard, the user device 106 may be a mobile device such as a smartphone, wearable smart device, tablet, laptop computer, or the like. In other embodiments, the user device 106 may be a stationary device such as a desktop computer, IoT device, networked terminal, or the like.

The user device 106 may comprise a communication device 152, a processing device 154, and a memory device 156. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 154 is operatively coupled to the communication device 152 and the memory device 156. The processing device 154 uses the communication device 152 to communicate with the network and other devices on the network, such as, but not limited to the entity computing system 103. The communication device 152 generally comprises a modem, antennae, WiFi or Ethernet adapter, radio transceiver, or other device for communicating with other devices on the network.

The memory device 156 may have computer-readable instructions 160 stored thereon, which in one embodiment includes the computer-readable instructions 160 of a user application 162. The user application 162 may comprise computer-executable program code which may instruct the processing device 154 to perform certain logic, data processing, and data storing functions of the application to accomplish the entity's and/or the user's objectives. For instance, the user application 162 may allow the user 102 to log onto the resource optimization computing system 104 to access the resource monitoring and real-time notification functions provided therein. In this regard, the user application 162 may be an entity-provided application such as a mobile app or software suite, or the user application 162 may be a third party application such as a web browser. In some embodiments, the memory device 156 includes data storage 158 for storing data related to the system environment, but not limited to data created and/or used by the user application 162.

As further illustrated in FIG. 1, the resource optimization computing system 104 may be a computing system within the entity system which provides resource efficiency projections and/or historical data tracking functions as described herein. Accordingly, the resource optimization computing system 104 may comprise a communication device 112, a processing device 114, and a memory device 116, where the processing device 114 is operatively coupled to the communication device 112 and the memory device 116. The processing device 114 uses the communication device 112 to communicate with the network and other devices on the network, such as, but not limited to the user device 106 and/or the entity computing system 103. As such, the communication device 112 generally comprises a modem, antennae, WiFi or Ethernet adapter, radio transceiver, or other device for communicating with other devices on the network.

The memory device 116 comprises computer-readable instructions 120 and data storage 118, which in one embodiment includes the computer-readable instructions 120 of a resource optimization application 122. The resource optimization application 122 may comprise executable code for causing the processing device 114 to generate optimization projects with respect to resource transfers between the entity computing system 103 and the user device 106. In this regard, the resource optimization computing system 104 may receive authentication credentials from the user 102, the user device 106, and/or the entity computing system 103 and authenticate/authorize users and applications based on the authentication credentials. Examples of said authentication credentials may include a username and password combination, PIN, secure token, cryptographic key, biometric data, or the like.

The operating environment 100 may further comprise an entity computing system 103. The entity computing system 103 may refer to a computing system which may be operated by a third party entity, such as a company which provides products and/or services to users (e.g., the user 102). The entity computing system 103 may comprise a processing device 174 operatively coupled to the communication device 172 and a memory device 176 comprising data storage 178 and computer readable instructions 180. The computer readable instructions 180 may comprise an entity application 182 which may be configured to instruct the processing device 174 to execute certain functions over the network, such as interacting with the user device 106 and/or the resource optimization computing system 104 to conduct resource transfers and/or receive historical and projected data regarding resource optimization. In this regard, the entity computing system 103 may be operated by a user such as an employee or administrator of the third party entity.

The communication device 172, and other communication devices as described herein, may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the entity computing system 103 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user 102, may include any of a number of devices allowing the devices to receive data from a user 102, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 illustrates a process flow 200 for the resource optimization system, in accordance with one embodiment of the present disclosure. The process begins at block 201, where the system continuously monitors a first set of resource transfers executed in a first format. In an exemplary embodiment, the first set of resource transfers may be a set of transactions executed by a third party entity with one or more users (e.g., an online currency transaction to customers for the provision of products and/or services). In such embodiments, the set of transactions may be executed in a first currency (e.g., USD).

The process continues to block 202, where the system, based on continuously monitoring the first set of resource transfers, generates a set of historical resource transfer data. The set of historical resource transfer data may comprise the sum of transactions executed by the third party entity. For instance, the historical resource transfer data may include all transactions executed by the third party entity with customers in the first currency. In some embodiments, the historical resource transfer data may further include transactions executed by the third party entity with customers in a second currency (e.g., JPY). In some embodiments, the historical resource transfer data may be limited to a certain time period or frequency (e.g., historical data for each year, month, seasonal period, or the like).

The process continues to block 203, where the system generates, based on the set of historical resource transfer data, a resource optimization report, wherein the resource optimization report comprises a resource efficiency metric. The resource efficiency metric may be an indicator which provides information regarding resource efficiency increases that have been gained, could have been gained, or may be gained in the future by comparing resource transfers executed in various different formats. Accordingly, the resource efficiency metric may be a normalized value which indicates the amount of resources saved (e.g., cost reduction) for transactions across various formats. For instance, if the third party entity typically conducts transactions in the first currency, the resource efficiency metric may display the resources that the third party entity would have saved if it had executed said transactions in the second currency. Conversely, if the third party executed the transactions in the more efficient format (e.g., the second currency), then the resource efficiency metric may indicate the resources that the third party saved by executing the transactions in the second format instead of the first format.

In other embodiments, the resource optimization report may comprise a projected resource efficiency metric which may predict the amount of resources saved by the third party if the third party executes future transactions in one format instead of another format. The projected resource efficiency metric may be based on such information as historical transaction data, exchange rates, projections of expected future transactions, or the like. Furthermore, the projected resource efficiency metric may also be calculated based at least in part on information about prospective changes provided by the third party entity. For example, the projected resource efficiency metric may change based on the third party entity providing information about projected growth or expansion, entering new markets, targeting different users, or the like. In this way, third party entities may track not only the resource efficiency of past or current actions taken, but also receive projections of resource efficiency for transactions taking place in the future, thereby allowing the third party entity to optimize the execution of resource transfers.

The resource optimization report may further include other types of information related to the historical and/or projected transactions in various formats, such as the region or regions from which the resource transfer requests are received, the resource transfer method selected by the users (e.g., credit card, third party electronic payment processor, or the like), products and/or services purchased by the users, or the like.

The process concludes at block 204, where the system displays the resource optimization report on a graphical interface of a third party computing system. The graphical interface may be presented to a user of the third party computing system such as an employee or administrator of the third party entity. In this regard, the resource efficiency metric may express the magnitude of resource efficiency for resource transfers made in a certain format and/or during a certain time period. For example, if the third party entity would have realized an efficiency gain from conducting transactions in a second format as opposed to a first format in the previous year, the resource efficiency metric may comprise a positive visual indicator (e.g., a directional arrow such as an up arrow, a change in stroke or highlighting color, or the like) which indicates the amount of resources that would have been saved by the third party entity. The positive indicator may be accompanied by a value indicating the magnitude of the resource efficiency, such as a numerical value (e.g., an absolute savings value, a percentage value, or the like). In some embodiments, the graphical interface may further comprise a visualization component, where the visualization component may display a series of resource efficiency metrics over a period of time. For example, the visualization component may be a line graph, bar graph, or the like which shows the resource efficiency metrics for various selected time periods (e.g., seasonal efficiency metrics for a given year).

In some embodiments, the system may be configured to display a notification to the user with an interactive link to enroll in certain products or services which may provide the third party entity with the ability to perform transactions in various other formats. For example, the resource efficiency metric may indicate that the third party entity would have realized a certain amount of resource efficiency if the third party entity would have supported transactions in a second format (e.g., Japanese Yen). In such an embodiment, the notification may query the third party entity about whether the third party entity wishes to begin the onboarding process of supporting transactions in the second format. In this regard, the notification may contain an interactive link (e.g., clickable hyperlink, button, or other interface element) which may send the third party entity to the first stage in the onboarding process (e.g., landing website, web portal, form, or the like).

In some embodiments, the graphical interface may comprise a number of interface elements (e.g., drop down menus, radio buttons, check boxes, text entry fields, clickable or interactive features, or the like) which may allow the system to refresh the resource optimization report in real time based on the selection of the interface elements (e.g., via filters) by the third party entity. For instance, the interface elements may include a time range element which allows the third party entity to dynamically select a time ranges to be used in the analysis as described above (e.g., the third party entity wishes to view a list of transactions with foreign customers over the past year compared to the transactions with foreign customers over the previous year). The interface elements may further include a set of check boxes representing the various regions from which the users submitted their resource transfer requests (e.g., the third party entity wishes to view resource efficiency metrics for transactions with customers from Great Britain and Switzerland from last month). In this way, third party entities may be instantly provided with the information needed to select the resource format which creates the optimal resource efficiency for any point in time.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for generating resource optimization reports through predictive analysis of resource transfers, the system comprising:
    a memory device with computer-readable program code stored thereon;
    a communication device; and
    a processing device operatively coupled to the memory device and the communication device, wherein the processing device is configured to execute the computer-readable program code to:
        monitor, using a resource optimization computing system, a first set of resource transfers in a first format over time, wherein the first set of resource transfers is a set of transactions;
        based on monitoring the first set of resource transfers generate a set of historical resource transfer data;
        generate, based on the set of historical resource transfer data, a resource optimization report for resource transfers, wherein the resource optimization report comprises a resource efficiency metric, wherein the resource efficiency metric is a comparison of an efficiency of the first set of resource transfers in the first format with an efficiency of the first set of resource transfers in a second format, wherein the resource efficiency metric further comprises a projected resource efficiency metric based on the historical resource transfer data, wherein the projected resource efficiency metric is a comparison of projected resource efficiency of the first set of resource transfers in the first format with a projected resource efficiency of the first set of resource transfers in the second format, wherein the projected resource efficiency metric is displayed as a percentage value, wherein the first format is a first currency and the second format is a second currency;
        transmit the resource optimization report over a network for display on a graphical interface of a third party computing system;
        determine that transferring a resource in the second format has a higher resource efficiency metric; and
        transmit, over the network to the third party computing system, a notification comprising an interactive link to facilitate resource transfers in the second format, wherein the interactive link presents a web portal to the third party computing system.

2. The system according to claim 1, wherein the resource efficiency metric comprises a visual indicator of resources that would have been saved if the first set of resource transfers in the first format was executed in the second format.

3. The system according to claim 2, wherein the graphical interface further comprises a numerical value associated with the visual indicator, wherein the numerical value indicates a magnitude of resource efficiency.

4. The system according to claim 1, wherein the resource efficiency metric indicates whether executing resource transfers in the second format creates a greater amount of resource savings than executing resource transfers in the first format.

5. The system according to claim 1, wherein the set of historical resource transfer data comprises records of one or more transactions executed within a selected time frame.

6. A computer program product for generating resource optimization reports through predictive analysis of resource transfers, the computer program product comprising at least one non-transitory computer readable medium having computer-readable program code portions embodied therein, the computer-readable program code portions comprising executable code portions for:
monitoring, using a resource optimization computing system, a first set of resource transfers in a first format over time, wherein the first set of resource transfers is a set of transactions;
based on monitoring the first set of resource transfers generating a set of historical resource transfer data;
generating, based on the set of historical resource transfer data, a resource optimization report for resource transfers, wherein the resource optimization report comprises a resource efficiency metric, wherein the resource efficiency metric is a comparison of an efficiency of the first set of resource transfers in the first format with an efficiency of the first set of resource transfers in a second format, wherein the resource efficiency metric further comprises a projected resource efficiency metric based on the historical resource transfer data, wherein the projected resource efficiency metric is a comparison of projected resource efficiency of the first set of resource transfers in the first format with a projected resource efficiency of the first set of resource transfers in the second format, wherein the projected resource efficiency metric is displayed as a percentage value, wherein the first format is a first currency and the second format is a second currency;
transmit the resource optimization report over a network for display on a graphical interface of a third party computing system;
determining that transferring a resource in the second format has a higher resource efficiency metric; and
transmitting, over the network to the third party computing system, a notification comprising an interactive link to facilitate resource transfers in the second format, wherein the interactive link presents a web portal to the third party computing system.

7. The computer program product according to claim 6, wherein the resource efficiency metric comprises a visual indicator of resources that would have been saved if the first set of resource transfers in the first format was executed in the second format.

8. The computer program product according to claim 7, wherein the graphical interface further comprises a numerical value associated with the visual indicator, wherein the numerical value indicates a magnitude of resource efficiency.

9. The computer program product according to claim 6, wherein the resource efficiency metric indicates whether executing resource transfers in the second format creates a greater amount of resource savings than executing resource transfers in the first format.

10. A computer-implemented method for generating resource optimization reports through predictive analysis of resource transfers, the method comprising:
monitoring, using a resource optimization computing system, a first set of resource transfers in a first format over time, wherein the first set of resource transfers is a set of transactions;
based on monitoring the first set of resource transfers generating a set of historical resource transfer data;
generating, based on the set of historical resource transfer data, a resource optimization report for resource transfers, wherein the resource optimization report comprises a resource efficiency metric, wherein the resource efficiency metric is a comparison of an efficiency of the first set of resource transfers in the first format with an efficiency of the first set of resource transfers in a second format, wherein the resource efficiency metric further comprises a projected resource efficiency metric based on the historical resource transfer data, wherein the projected resource efficiency metric is a comparison of projected resource efficiency of the first set of resource transfers in the first format with a projected resource efficiency of the first set of resource transfers in the second format, wherein the projected resource efficiency metric is computed as a percentage value, wherein the first format is a first currency and the second format is a second currency;
transmitting the resource optimization report over a network for display on a graphical interface of a third party computing system;
determining that the second format has a higher resource efficiency metric; and
transmitting, over the network to the third party computing system, a notification comprising an interactive link to facilitate resource transfers in the second format, wherein the interactive link presents a web portal to the third party computing system.

11. The computer-implemented method of claim 10, wherein the resource efficiency metric comprises a visual indicator of resources that would have been saved if the first set of resource transfers in the first format was executed in the second format.

12. The computer-implemented method of claim 11, wherein the graphical interface further comprises a numerical value associated with the visual indicator, wherein the numerical value indicates a magnitude of resource efficiency.

13. The computer-implemented method of claim 10, wherein the resource efficiency metric indicates whether executing resource transfers in the second format creates a greater amount of resource savings than executing resource transfers in the first format.

14. The computer-implemented method of claim 10, wherein the set of historical resource transfer data comprises records of one or more transactions executed within a selected time frame.

* * * * *